US005517389A

United States Patent [19]

Myers

[11] Patent Number: 5,517,389

[45] Date of Patent: May 14, 1996

[54] ELECTROCHROMIC LAMP ASSEMBLIES

[75] Inventor: Christopher A. Myers, Holly, Mich.

[73] Assignee: Ford Motor Company, Dearborn, Mich.

[21] Appl. No.: 225,857

[22] Filed: Apr. 11, 1994

[51] Int. Cl.$^6$ ........ B60Q 1/04

[52] U.S. Cl. ........ 362/61; 362/214; 362/318; 362/343

[58] Field of Search ........ 362/61, 80, 214, 362/277, 280, 318, 319, 343

[56] References Cited

U.S. PATENT DOCUMENTS

| | | | |
|---|---|---|---|
| 4,348,078 | 9/1982 | McIntyre | 350/357 |
| 4,465,339 | 8/1984 | Baucke et al. | 350/357 |
| 4,916,470 | 4/1990 | Kovacs et al. | 346/160 |
| 4,990,286 | 2/1991 | Gordon | 252/518 |
| 5,023,758 | 6/1991 | Allen et al. | 362/318 X |
| 5,239,406 | 8/1993 | Lynam | 359/275 |
| 5,255,163 | 10/1993 | Neumann | 362/318 X |
| 5,264,993 | 11/1993 | Neumann et al. | 362/318 X |

*Primary Examiner*—Stephen F. Husar
*Attorney, Agent, or Firm*—Damian Porcari; Roger L. May

[57] ABSTRACT

The lamp assembly including a reflector having two or more reflective surfaces, a light source and an electrochromic means positioned between the light source and at least one reflective surface. Each reflective surface directs light in a different direction. The electrochromic means is capable of blocking light from exiting the lamp assembly from at least one direction.

8 Claims, 3 Drawing Sheets

ELECTROCHROMIC LAMP ASSEMBLIES

FIELD OF THE INVENTION

The present invention is directed to a lamp assembly having an electrochromic element. More particularly, the invention is directed to a lamp assembly having two or more reflective surfaces directing light in two or more directions.

BACKGROUND OF THE INVENTION

Automobiles include an array of light sources to direct light in desired directions. For example, automobiles include a low beam and a high beam light source. These light sources may be different headlamp assemblies with separate bulbs and reflectors or may be combined into one reflector with multiple light sources. The multiple light sources may be included as a single bulb with two filaments. Other lighting requirements include turn signals, turning lights, fog lights and parking lights. These multiple light requirements have been satisfied in a variety of ways including using multiple reflectors and light sources. Under some conditions, it is possible to use the same reflector with two light sources such as high and low beams. High and low beam lamps generally use a single reflector with two light sources. The light sources may be combined within a single bulb as two filaments. It is difficult to optimize the reflector surface for both high beam and low beam applications. It is difficult and extremely costly to have movable reflectors or light sources in automotive headlamp applications. The extreme temperatures and shock in vibration make movable components undesirable.

Electrochromics have been used in automotive applications to provide reduced reflective reflectivities in side view and rear view mirrors. The same technology is useful in directing light in a lighting application. It is possible to construct a headlamp assembly that does not include movable components from multiple light sources to direct light in two or more directions.

SUMMARY OF THE INVENTION

The present invention teaches a lamp assembly having a light source and medium light rays. A reflective surface reflects the light rays to a desired location. An electrochromic means positioned between the reflective surface and the light source is operable between an opaque and a translucent condition. When the electrochromic means is translucent, it permits light to pass through it and to the reflective surface. When the electrochromic means is opaque, it blocks the light rays and the reflective surface does not receive light from the light source.

The electrochromic means may be attached to the reflective surface or may be free-standing intermediate the reflective surface and the light source. The invention is particularly useful in headlamp assemblies utilizing a molded reflector having two or more reflecting surface areas. Electrochromic means is placed to receive light directed to one area and not receive light directed to the other area. The invention may be useful as a discriminator between high and low beams. The invention may also be used to direct light to the side of the vehicle, for example, as turning lights or turn signals.

DETAILED DESCRIPTION OF THE PREFERRED EMBODIMENT

Figure 1:
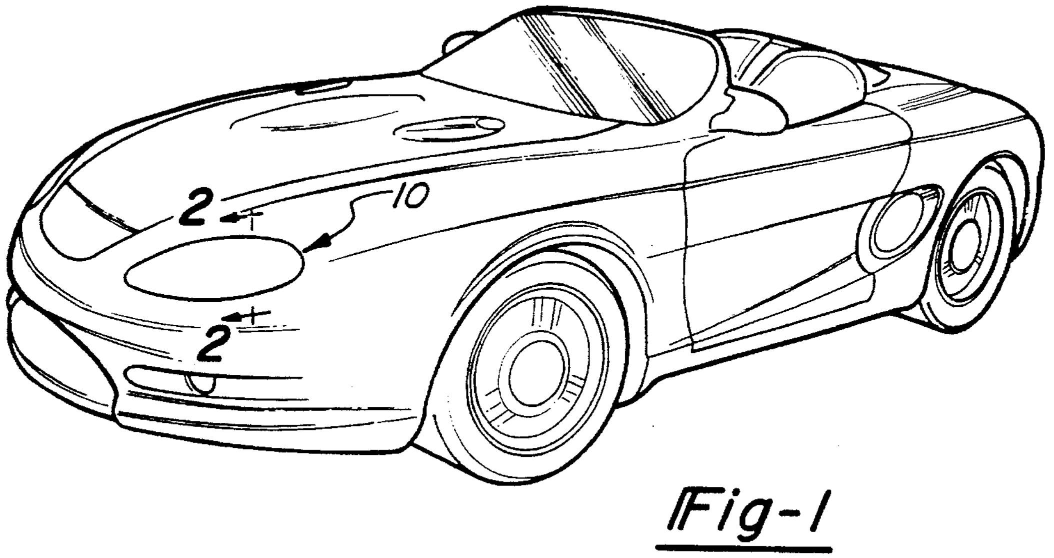
FIG. 1 illustrates a frontal perspective view of an automobile.

FIG. 1 illustrates a perspective frontal view of an automobile containing the present invention. Lamp assembly 10 displays high and low beam lighting using a single light source. Lamp assembly 10 may also be adapted to display turning lights or turn signals. A driver operated switch (not shown) selectively gauges the high or low beams.

Figure 2:
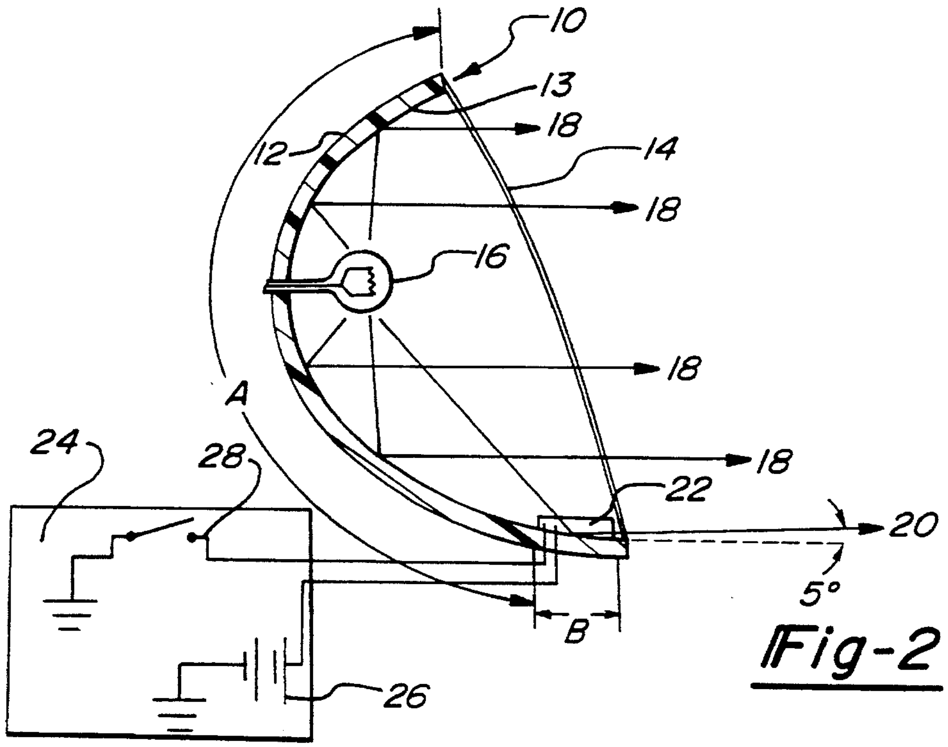
FIG. 2 is a detail cross-sectional view of the lamp assembly taken along the lines 2—2 in FIG. 1.

FIG. 2 illustrates a cross sectional view of lamp assembly 10. Assembly 10 generally comprises a molded reflector 12 and a transparent lens 14. Reflector 12 has highly mirrored surface 13 that reflects light efficiently. Reflector 12 may be made of a variety of shapes, most preferred is a generally parabolic shape having first surface area A and a second surface area B. First surface area A is generally formed in the shape of a parabolic reflector. A light source 16 is placed at the focal point of first surface A. Light source 16 emits rays of light. Light rays 18 are reflected from first surface A and exit lamp assembly 10 in a generally parallel direction. Light ray 20 reflects from surface B and exits lamp assembly 10 at an angle to rays 18. Light rays 18 function as normal low beams and light ray 20 functions as a high beam.

Attached atop surface B is an electrochromic means 22. Electrochromic means 22 may be manufactured from a variety of materials. Generally, it is translucent in the absence of an electrical charge as shown in FIG. 2. Light ray 20 passes through electrochromic means 22 and is reflected from surface B and again passes through electrochromic means 22 and lens 14. Electrochromic means 22 is operated by electrical circuit 24. Circuit 24 includes a source of electrical energy 26 and a switch 28. Switch 28 is generally placed within the cabin compartment of a vehicle and is operated by the driver.

Figure 3:
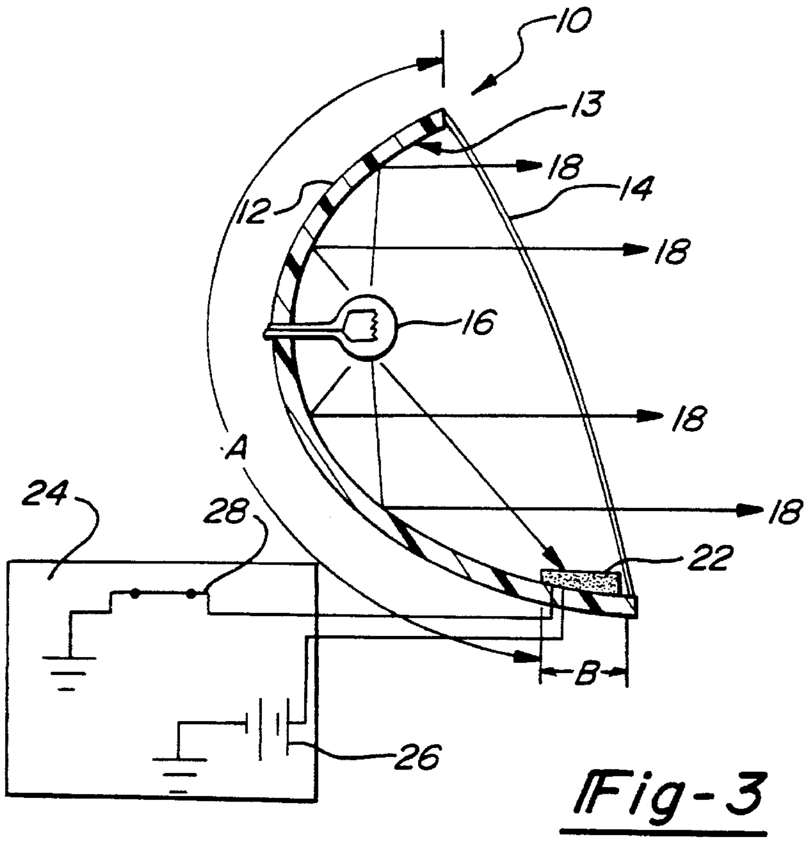
FIG. 3 illustrates the invention shown in FIG. 2 directing light in one direction.

Electrochromic means 22 is generally translucent when switch 28 is in the open position. When switch 28 is moved to the closed position as shown in FIG. 3, circuit 24 energizes electrochromic means 22. Crystals within electrochromic means 22 align in an electric field and cause electrochromic means 22 to become opaque. Electrochromic means 22 blocks ray 20. Ray 20 does not reflect from surface B. Lamp assembly 10 does not emit high beam light.

The invention has been described as a method of displaying high and low beams using a single light source and reflector by mounting an electrochromic means on the lower portion of a reflector. The invention may be adapted for electrochromic means 22 along the lower surface of a reflector. The invention may be adapted for use as a cornering light or turn signal indicator by mounting electrochromic means 22 along the inner surface of a reflector to reflect light towards the sides of a vehicle. Fog lamps generally direct light downward. The invention may be adapted for use as fog lights by mounting electrochromic means 22 on the upper surface of the reflector.

Figure 4:
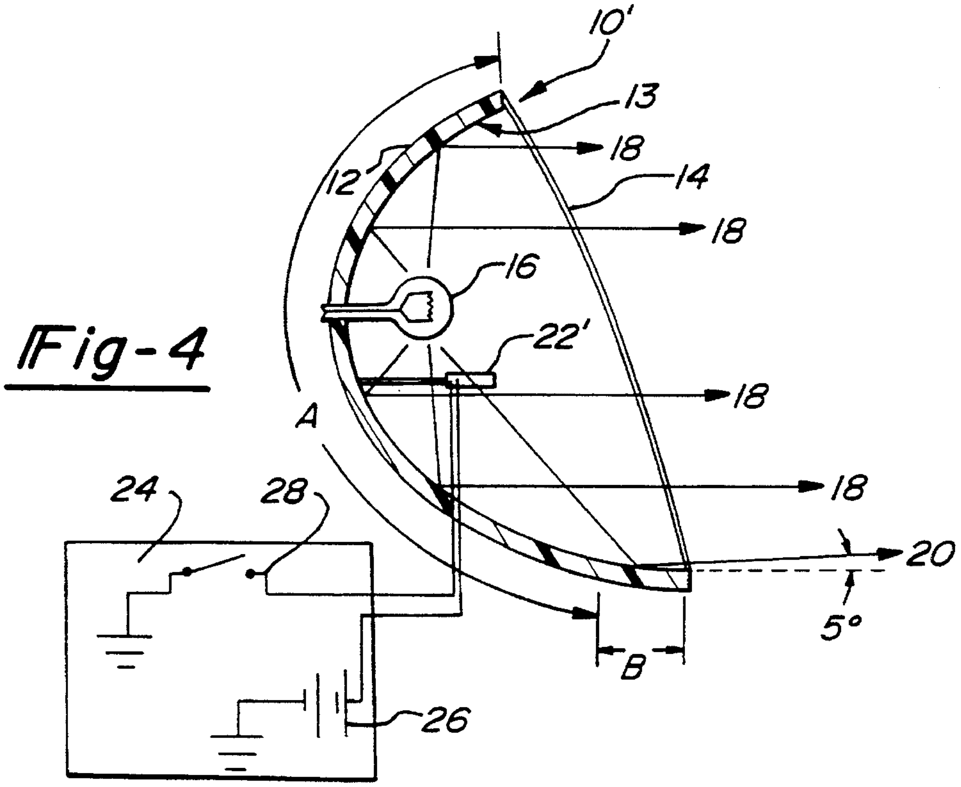
FIGS. 4 and 5 illustrate an alternative embodiment of the present invention.
Figure 5:
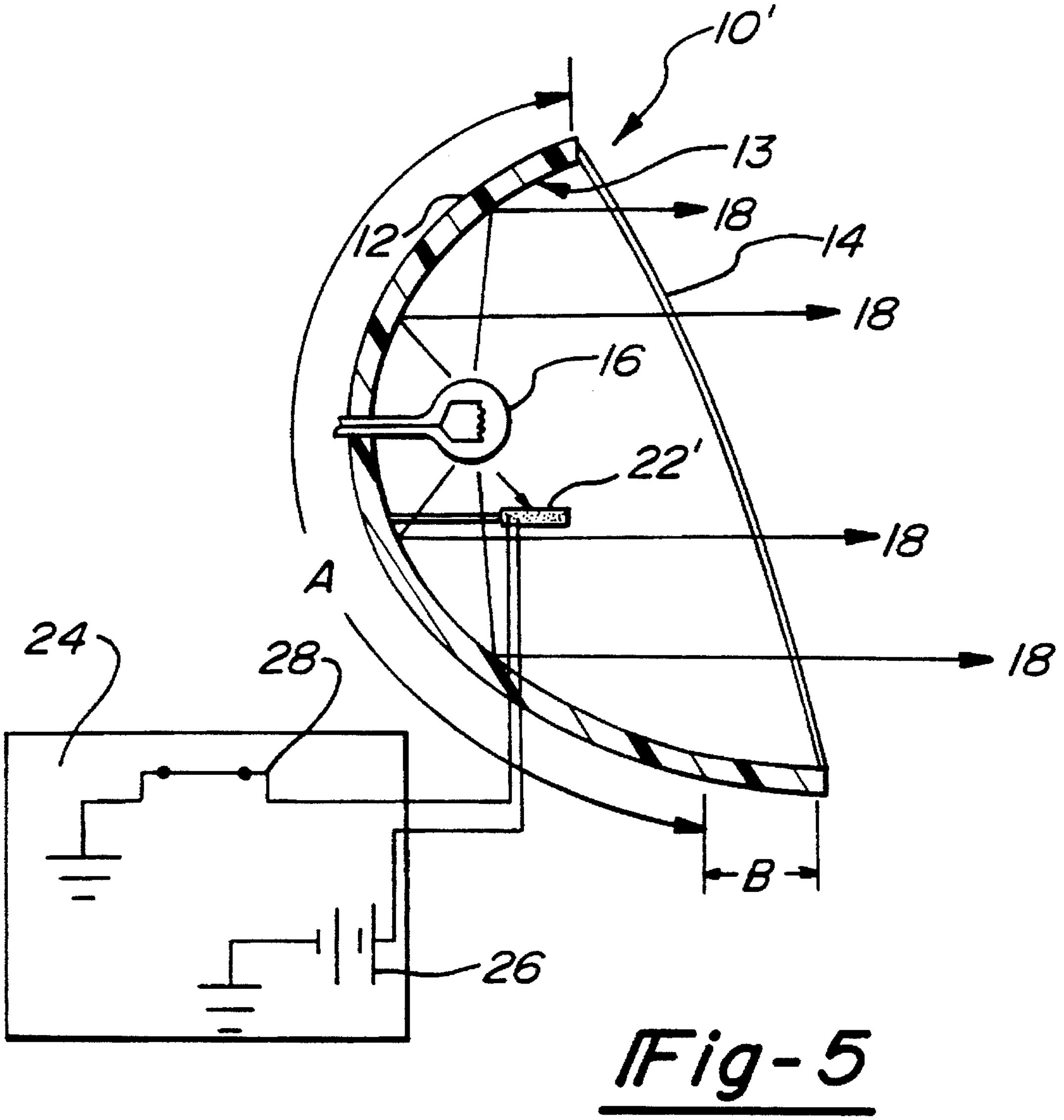

Illustrated in FIGS. 4 and 5 is an alternative embodiment of the present invention. Lamp assembly 10 prime is generally the same as lamp assembly 10 illustrated in FIGS. 2 and 3. Electrochromic means 22 prime is placed near light source 16. Electrochromic means 22 prime may be attached either to light source 16 or to reflector 12 by means of a thin stalk (not shown) as commonly used for secondary bulb reflectors. Illustrated in FIG. 4 is electrochromic means 22 prime in a translucent condition. Light ray 20 passes through electrochromic means 22 prime and strikes reflective surface B. Light ray 20 exits lamp assembly 10 prime at an angle to light rays 18. This configuration is used as a high beam headlight. Illustrated in FIG. 5 is electrochromic means 22 prime in an opaque condition. Light ray 20 is blocked by electrochromic means 22 prime. Light ray 20 does not reach reflective surface B. Light rays 18 exit lamp assembly 10 prime as low beam headlights.

The present invention has been illustrated as a headlamp assembly but other variations may be made without departing from the spirit and scope of the appended claims. For example, cornering lights or turning indicators may also be adapted by placing the electrochromic means at a different position on the reflector. The electrochromic means has been illustrated as translucent in the absence of an electrical source and opaque when subjected to an electrical source. The reverse situation is also possible and contemplated within the present invention.

I claim:

1. An automotive lamp assembly comprising:

a light source emitting light rays;

a first reflective surface reflecting said light rays in a first direction as low beam head lights;

a second reflective surface reflecting said light rays in a second direction as turning lights; and an electrochromic means positioned between said second reflective surface and said light source, said electrochromic means being operable between an opaque and a translucent condition, whereby said assembly directs light in said second direction when said electrochromic means is in a translucent condition and said assembly does not direct light in said second direction when said electrochromic means is in an opaque condition.

2. The lamp assembly of claim 1, wherein said electrochromic means is positioned juxtaposed said second reflective surface.

3. The lamp assembly of claim 1, wherein said electrochromic means is positioned near said light source.

4. The lamp assembly of claim 1, further comprising a switch communicating with said electrochromic means, said switch selecting said opaque and said translucent condition.

5. An automotive lamp assembly comprising:

a light source emitting light rays;

a first reflective surface reflecting said light rays in a first direction as low beam head lights;

a second reflective surface reflecting said light rays in a second direction as fog lights; and an electrochromic means positioned between said second reflective surface and said light source, said electrochromic means being operable between an opaque and a translucent condition, whereby said assembly directs light in said second direction when said electrochromic means is in a translucent condition and said assembly does not direct light in said second direction when said electrochromic means is in an opaque condition.

6. The lamp assembly of claim 5, wherein said electrochromic means is positioned juxtaposed said second reflective surface.

7. The lamp assembly of claim 5, wherein said electrochromic means is positioned near said light source.

8. The lamp assembly of claim 5, further comprising a switch communicating with said electrochromic means, said switch selecting said opaque and said translucent condition.

* * * * *